US012341820B2

(12) United States Patent
M M et al.

(10) Patent No.: US 12,341,820 B2
(45) Date of Patent: Jun. 24, 2025

(54) SYSTEM AND METHOD FOR PROVIDING LOCATION-BASED ACCESS IN 5G

(71) Applicant: Cisco Technology, Inc., San Jose, CA (US)

(72) Inventors: Niranjan M M, Bengaluru (IN); Nagaraj Kenchaiah, Bengaluru (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 254 days.

(21) Appl. No.: 17/931,192

(22) Filed: Sep. 12, 2022

(65) Prior Publication Data
US 2024/0089290 A1     Mar. 14, 2024

(51) Int. Cl.
*H04L 29/06*     (2006.01)
*H04L 9/40*      (2022.01)

(52) U.S. Cl.
CPC .......... *H04L 63/20* (2013.01); *H04L 63/0853* (2013.01)

(58) Field of Classification Search
CPC ............................. H04L 63/20; H04L 63/0853
See application file for complete search history.

(56) References Cited

U.S. PATENT DOCUMENTS

| | | | |
|---|---|---|---|
| 10,237,070 B2 * | 3/2019 | Lindemann | ........... H04L 9/3231 |
| 2016/0224799 A1 | 8/2016 | Uzun et al. | |
| 2018/0083943 A1 * | 3/2018 | Bowman | ................. H04L 63/08 |
| 2018/0109945 A1 | 4/2018 | Kweon et al. | |
| 2021/0360401 A1 | 11/2021 | Marinho et al. | |

FOREIGN PATENT DOCUMENTS

| | | | | |
|---|---|---|---|---|
| CA | 2915570 A1 * | 12/2014 | ............ | H04L 63/08 |
| CA | 3025198 A1 * | 12/2017 | ............ | G06F 21/41 |

OTHER PUBLICATIONS

Borcoci, Eugen & Ambarus, Tudor & Bruneau-Queyreix, Joachim & Negru, Daniel & Batalla, Jordi. (2016). Optimization of Multi-server Video Content Streaming in 5G Environment. Download citation of Optimization of Multi-server Video Content Streaming in 5G Environment (researchgate.net).
Tomasin, Stefano, Marco Centenaro, Gonzalo Seco-Granados, Stefan Roth, and Aydin Sezgin. 2021. "Location-Privacy Leakage and Integrated Solutions for 5G Cellular Networks and Beyond" Sensors21, No. 15: 5176. https://doi.org/10.3390/s21155176.

* cited by examiner

*Primary Examiner* — Tri M Tran
(74) *Attorney, Agent, or Firm* — Baker Botts L.L.P.

(57) ABSTRACT

In one embodiment, a method includes transmitting, to a multi-factor authentication (MFA) agent running on a user device, a request for a location of the user device, receiving, from the MFA agent, the location of the user device, wherein the location is determined by the MFA agent to be a most common location indicated by a plurality of location indicators, receiving, from a policy server, a location-based access policy, appending, to the location-based access policy, the location of the user device and determining, based on the location of the user device and the location-based access policy, whether to allow the user device to access one or more of: a remote service, a remote database, and a remote device.

20 Claims, 4 Drawing Sheets

SYSTEM AND METHOD FOR PROVIDING LOCATION-BASED ACCESS IN 5G

TECHNICAL FIELD

The present disclosure relates generally to 5G networks, and more specifically to providing location-based access to remote devices, services, and databases in 5G networks.

BACKGROUND

Presently, devices may access remote devices, services, and databases on a policy basis. Access may also be provided based on the location of the device, but such location-based restrictions are easily bypassed using, for example, a virtual private network (VPN) to hide the true location of the device.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Presently, devices may access remote devices, services, and databases on a policy basis. Access may also be provided based on the location of the device, but such location-based restrictions are easily bypassed using, for example, a virtual private network (VPN) to hide the true location of the device. Further, there are a variety of laws and regulations for providing data protection and privacy. It is necessary to guarantee that providing personally identifiable information (PII) data (e.g., governmental department data, personal health records, etc.) adheres to these laws and regulations. A method is needed for providing policy-based access based on the current location of a 5G user device running various apps to access remote services, databases, and devices to ensure data protection and adherence to privacy laws and regulations.

According to an embodiment, a system includes one or more processors and one or more computer-readable non-transitory storage media coupled to the one or more processors. The one or more computer-readable non-transitory storage media include instructions that, when executed by the one or more processors, cause one or more components of the system to perform operations including transmitting, to a multi-factor authentication (MFA) agent running on a user device, a request for a location of the user device. The operations also include receiving, from the MFA agent, the location of the user device, and the location is determined by the MFA agent to be a common location indicated by a plurality of location indicators. The operations further include appending, to the location-based access policy, the location of the user device. The operations further include determining, based on the location of the user device and the location-based access policy, whether to allow the user device to access one or more of: a remote service, a remote database, and a remote device.

In certain embodiments, the operations may include determining whether the user device is within a pre-defined geographic border. In certain embodiments, the operations may include determining whether the location of the user device corresponds to a geographic identifier associated with the user device. In certain embodiments, the operations may include authenticating the user device via an authentication server and receiving an authentication result from the authentication server.

According to another embodiment, a method includes transmitting, to a multi-factor authentication (MFA) agent running on a user device, a request for a location of the user device. The operations also include receiving, from the MFA agent, the location of the user device, and the location is determined by the MFA agent to be a common location indicated by a plurality of location indicators. The operations further include appending, to the location-based access policy, the location of the user device. The operations further include determining, based on the location of the user device and the location-based access policy, whether to allow the user device to access one or more of: a remote service, a remote database, and a remote device.

According to yet another embodiment, one or more computer-readable non-transitory storage media embody instructions that, when executed by a processor, cause the processor to perform operations including transmitting, to a multi-factor authentication (MFA) agent running on a user device, a request for a location of the user device. The operations also include receiving, from the MFA agent, the location of the user device, and the location is determined by the MFA agent to be a common location indicated by a plurality of location indicators. The operations further include appending, to the location-based access policy, the location of the user device. The operations further include determining, based on the location of the user device and the location-based access policy, whether to allow the user device to access one or more of: a remote service, a remote database, and a remote device.

Technical advantages of certain embodiments of this disclosure may include one or more of the following. Embodiments of this disclosure provide remote access to remote devices, remote services, and remote databases based on the current location of a 5G user device. Embodiments of this disclosure provide data privacy by restricting data access based on region, country, state, province, or customer specific location-based policy. Embodiments of this disclosure provide remote access to remote devices, remote services, and remote databases based on the current location of a 5G user device even when a user is remotely accessing a device, service, or database over a virtual private network (VPN) connection.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 1:
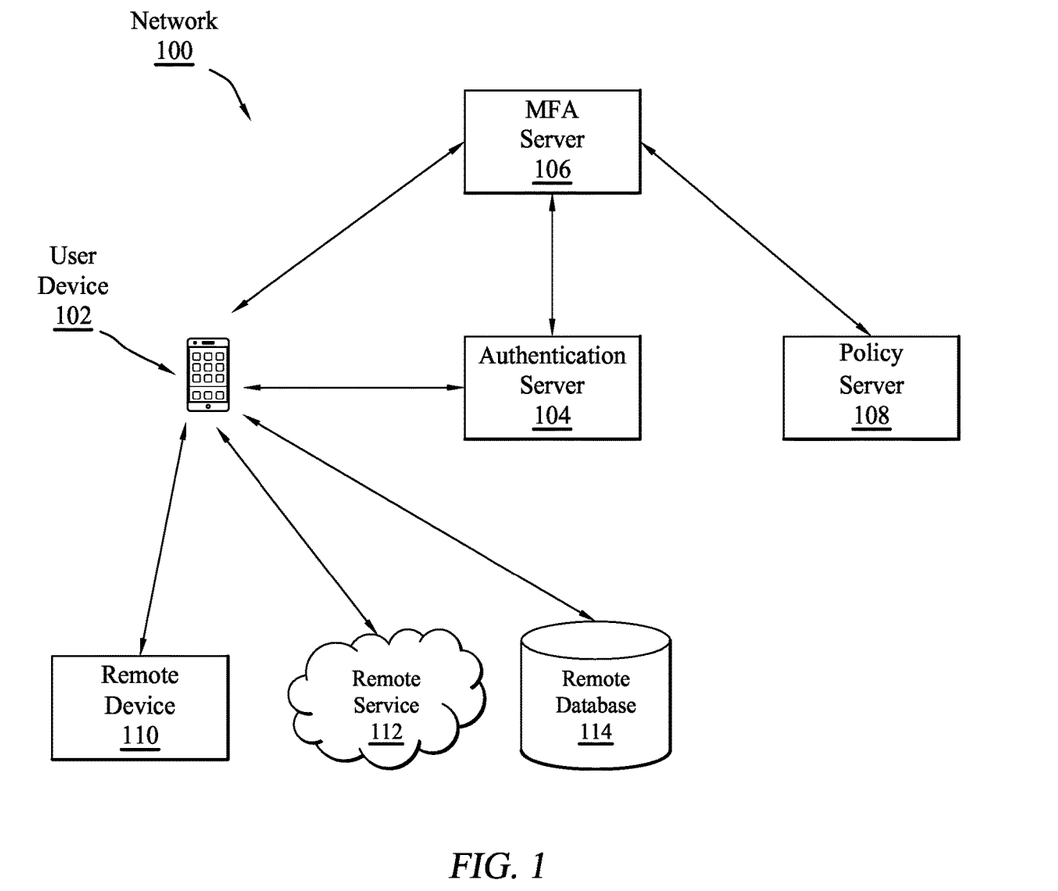
FIG. 1 illustrates a network that facilitates a location-based access policy, in accordance with certain embodiments.
Figure 2:
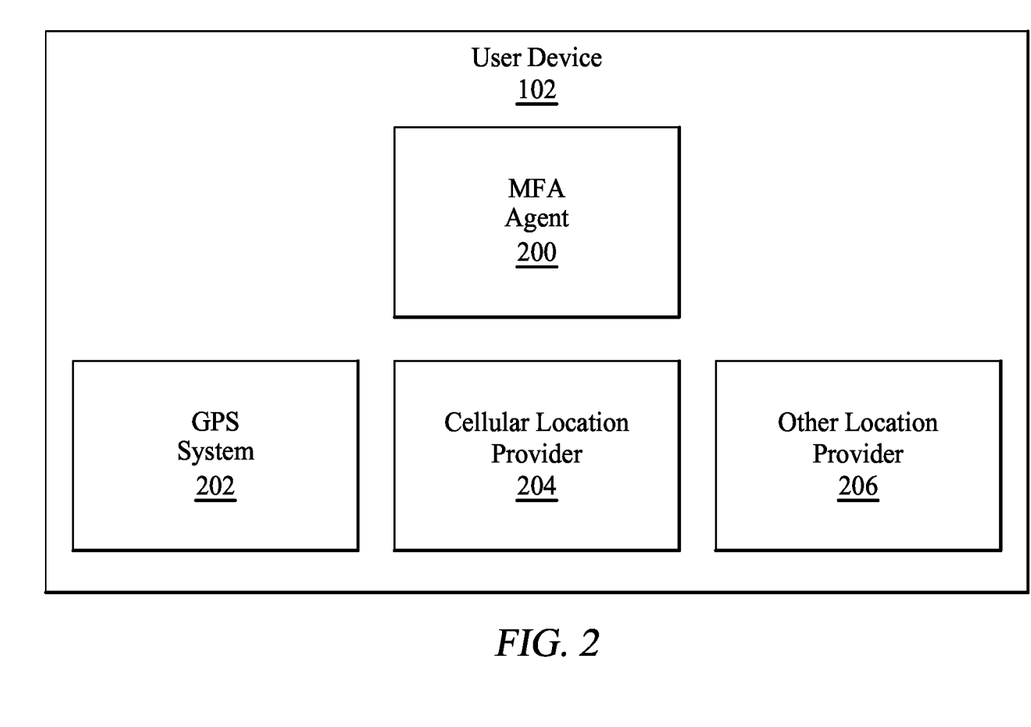
FIG. 2 illustrates a user device, in accordance with certain embodiments.
Figure 3:
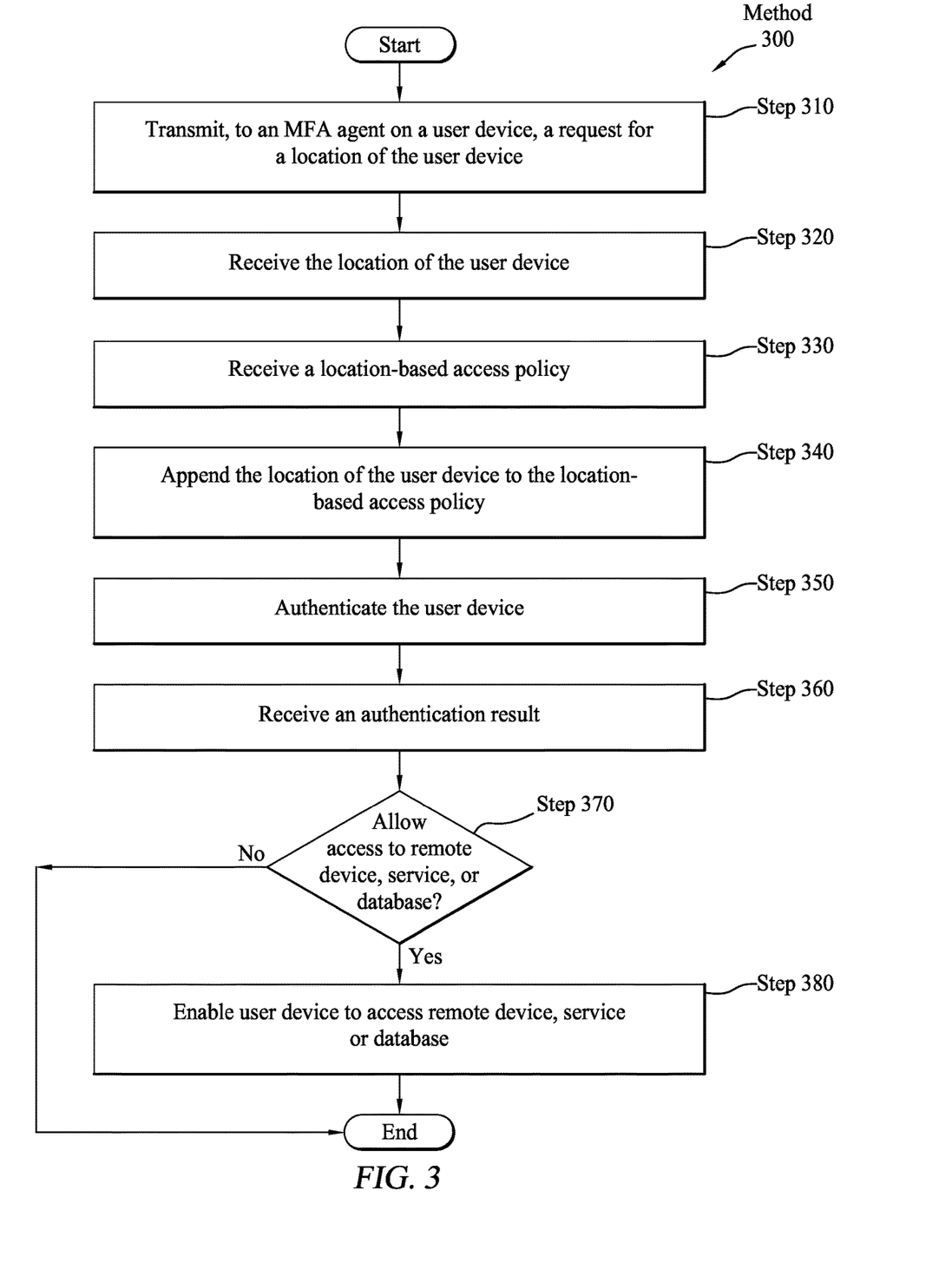
FIG. 3 illustrates a method for providing location-based access to a remote device, service, or database.
Figure 4:
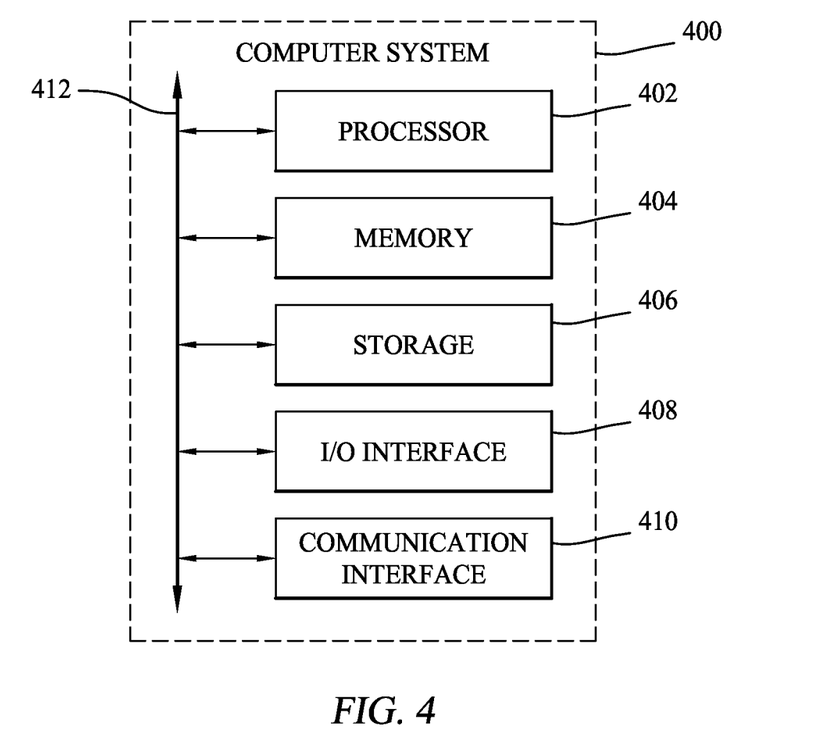
FIG. 4 illustrates an example of a computer system, in accordance with certain embodiments.

This disclosure describes systems and methods for providing location-based access to remote devices, services, and databases. FIG. 1 illustrates a network 100 that facilitates a location-based access policy, in accordance with certain embodiments. FIG. 2 illustrates a user device 102, in accordance with certain embodiments. FIG. 3 illustrates a method for providing location-based access to a remote device, service, or database. FIG. 4 illustrates an example of a computer system, in accordance with certain embodiments.

FIG. 1 illustrates a network 100 that facilitates a location-based access policy, in accordance with certain embodiments. In the illustrated embodiment, network 100 includes user device 102, authentication server 104, multi-factor authentication (MFA) server 106, policy server 108, remote device 110, remote service 112, and remote database 114.

Network 100 is any type of network that facilitates communication between components of network 100. Network 100 may connect one or more components of network 100. One or more portions of network 100 may include an ad-hoc network, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Internet, a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 100 may include one or more different types of networks. Network 100 may be any communications network, such as a private network, a public network, a connection through the Internet, a mobile network, a WI-FI network, etc. One or more components of network 100 may communicate over network 100. Network 100 may include a core network (e.g., the Internet), an access network of a service provider, an Internet service provider (ISP) network, and the like.

User device 102 may refer to a device that a user uses to communicate with other components of network 100. Examples of user device 102 may include a desktop computer system, a laptop or notebook computer system, a mobile telephone (such as a smartphone), a personal digital assistant (PDA), a tablet computer system, and so on. In certain embodiments, a user may be associated with multiple user devices 102. The user may use user device 102 to seek access to one or more of remote device 110, remote service 112, and remote database 114. The user may further use user device 102 to receive and respond to certain authentication factors. For example, the user may have an account established with policy server 108, and the user may have pre-configured the account such that second authentication factors are pushed to an app running on user device 102. As one example, the user may have an account established with Cisco® Duo, and the user may have pre-configured the account such that authentication prompts, such as Cisco® Duo-pushes, are pushed to a Cisco® Duo Connect application running on user device 102.

Authentication server 104 authenticates user device 102 in a first level of authentication. In certain embodiments, authentication server 104 may comprise a module having authentication, authorization, and account (AAA) capabilities. As known and understood by those of skill in the art, AAA capabilities may help secure wireless networks (e.g., network 100) against unauthorized access. In certain embodiments, authentication server 104 may comprise a Remote Authentication Dial-In User Service (RADIUS) server having AAA capabilities. In certain embodiments, authentication server 104 may comprise a Terminal Access Controller Access-Control System Plus (TACACS+) server. In certain embodiments, authentication server 104 may comprise a Cisco® Identity Services Engine (ISE) server. In some embodiments, authentication server 104 may verify that the user of user device 102 has provided valid login credentials associated with the user. Examples of login credentials include a username and password. In certain embodiments, authentication server 104 may validate the geographic identifier of the user of user device 102. Authentication server 104 may maintain a mapping of user credentials to user geographic identifier. Authentication server 104 may use any suitable authentication and authorization process.

MFA server 106 authenticates user device 102 in a second level of authentication. In certain embodiments, MFA server 106 may authenticate user device 102 using a real-time verification of the user of user device 102. For example, MFA server 106 may verify whether the user of user device 102 responds affirmatively and promptly to a prompt (e.g., a Cisco® Duo prompt, such as a Cisco® Duo push) configured or managed by policy server 108. MFA server 106 may prompt user device 102 for the location information of user device 102. MFA server 106 may fetch one or more location-based access policies from policy server 108. MFA server 106 may check the location of user device 102 against the location-based access policies in determining to whether to grant user device 102 access to one or more of remote device 110, remote service 112, and remote database 114.

Policy server 108 maintains policy details for network 100. In certain embodiments, policy server 108 may comprise a centralized server (e.g., Cisco's Digital Network Architecture Center (DNA-C) server). In certain embodiments, policy server 108 may run Security as a Service (SaaS). In certain embodiments, policy server 108 may be distributed across two more policy server instances. For example, policy server 108 may be distributed across one or more policy server instances that use blockchain technology and one or more other securely coordinated policy server instances. In certain embodiments, policy server 108 maintains location-based access policies for each and every remote device 110, remote service 112, and remote database 114 in network 100. In certain embodiments, the location-based access policies may be managed and configured from DNA-C. In certain embodiments, policy server 108 is configured to provide location-based access policies to MFA server 106.

Remote device 110 may include a desktop computer system, a laptop or notebook computer system, a mobile telephone (such as a smartphone), a personal digital assistant (PDA), a tablet computer system, and so on. Remote device 110 is connected to network 100 and is remote from user device 102. Remote service 112 may include a service provider from providing some service to user device 102. Remote service 112 is connected to network 100 and is remote from user device 102. Remote database 114 may include storage for electronically organizing and storing data. Remote database 114 is connected to network 100 and is remote from user device 102.

Although FIG. 1 illustrates a particular number of networks 100, user devices 102, authentication servers 104, MFA servers 106, policy servers 108, remote devices 110, remote services 112, and remote databases 114, this disclosure contemplates any suitable number of networks 100, user devices 102, authentication servers 104, MFA servers 106, policy servers 108, remote devices 110, remote services 112, and remote databases 114. Additionally, this disclosure contemplates any suitable arrangement of network 100, user device 102, authentication server 104, MFA server 106, policy server 108, remote device 110, remote service 112, and remote database 114. Additionally, this disclosure contemplates any suitable combination of any suitable components, devices, or systems carrying out any suitable actions.

In an exemplary embodiment of operation, MFA server 106 transmits a request for a location of user device 102 to MFA agent 200 that is running on user device 102. MFA agent 200 determines the location of user device 102 and transmits the location of user device 102 to MFA server 106. The location of user device 102 is determined by gathering location indicators from various location providers and selecting the common location from among the location indicators. For example, if there are three location indicators from three different location providers and two of the location indicators are associated with a Location A and one location indicator is associated with a Location B, then Location A is selected as the location of the user device. If no single location is the most common location indicated by the received location indicators (e.g., two or more locations are tied for the most common location indicated by the received location indicators), MFA agent 200 may select the location indicated by a predetermined location provider. For example, an administrator may predefine a particular location provider (e.g., GPS system 202 or cellular location provider 204) as the controlling location provider in the event that two or more locations are tied for the most common location.

MFA server 104 receives a location-based access policy from policy server 108. MFA server 106 appends the location of user device 102 to the location-based access policy. For example, the location of user device 102 may be appended to the end of a data structure storing the location-based access policy. The location of user device 102 may be represented in a particular format when appended to the location-based access policy. For example, the location of user device 102 may be represented by a coordinate value (e.g., a latitude and longitude coordinate). As another example, the location of user device 102 may be represented by a geographic label (e.g., a country, a state, a providence, or a city). In certain embodiments, once the location of user device 102 is appended to the location-based access policy, the location-based access policy may be stored in storage on MFA server 106. In certain other embodiments, the location-based access policy may be stored in storage on policy server 108. In certain embodiments, when the location of user device 102 changes, the new location of user device 102 may be appended to the location-based access policy. MFA server 106 then determines whether to allow user device 102 to access one or more of remote device 110, remote service 112, and remote database 114 based on the location of user device 102 and the location-based access policy.

In certain embodiments, the location indicators are generated by location information providers including one or more of: a GPS system (e.g., GPS system 202), a cellular location provider (e.g., cellular location provider 204), and an other location provider (e.g., other location provider 206). The other location provider could be, for example, a third-party tool (e.g., skyhook.com) or any suitable method or system for determining the location of user device 102. For example, the third-party tool may include precision location software to determine the location of user device 102. In certain embodiments, policy server 108 is distributed using a plurality of policy server instances. For example, policy server 108 may be distributed across one or more policy server instances which use blockchain technology and one or more other securely coordinated policy server instances.

In certain embodiments, MFA server 106 determines whether to allow user device 102 to access one or more of remote device 110, remote service 112, and remote database 114 by determining whether user device 102 is located within a pre-defined geographic border. For example, the geographic border may be a particular country. As another example, the geographic border may be an organization's facilities such as an office building or a campus. In certain embodiments, MFA server 106 determines whether to allow user device 102 to access one or more of remote device 110, remote service 112, and remote database 114 by determining whether the location of user device 102 corresponds to a geographic identifier associated with user device 102. For example, MFA server 106 may only allow access to remote device 110, remote service 112, or remote database 114 if the geographic identifier of the user associated with user device 102 and the location of user device 102 correspond to the same country.

In certain embodiments, user device 102 is authenticated by authentication server 104. MFA server 106 may receive an authentication result from authentication server 104. For example, authentication server 104 may verify that the user of user device 102 has provided valid login credentials associated with the user. If the login credentials are valid, authentication server 104 may provide an authentication result to MFA server 106 indicating that user device 102 is authenticated. In certain further embodiments, MFA server 106 determines whether to allow user device 102 to access remote device 110, remote service 112, or remote database 114 based on the location of user device 102, the location-based access policy, and the authentication result from authentication server 104.

FIG. 2 illustrates a user device 102, in accordance with certain embodiments. In the illustrated embodiment, user device 102 includes MFA agent 200, global positioning system 202, cellular location provider 204, and other location provider 206.

MFA agent 206 may include software running on one or more components of user device 102. In certain embodiments, MFA agent 206 receives requests for location information from MFA server 106. In certain embodiments, MFA agent 206 collects location indicators from various location providers (e.g., GPS system 202, cellular location provider 204, and other location provider 206) to determine the location of user device 102. In certain embodiments, the location of user device 102 is determined to be the common location from the various location indicators collected by MFA agent 206. For example, if there are three location indicators from three different location providers and two of the location indicators are associated with a Location A and one location indicator is associated with a Location B, then Location A is selected as the location of the user device. If no single location is the most common location indicated by the received location indicators (e.g., two or more locations are tied for the most common location indicated by the received location indicators), MFA agent 200 may select the location indicated by a predetermined location provider. For example, an administrator may predefine a particular location provider (e.g., GPS system 202 or cellular location provider 204) as the controlling location provider in the event that two or more locations are tied for the most common location. In certain embodiments, MFA agent 206 sends the location of user device 102 to MFA server 106.

GPS system 202 may include one or more components for determining the GPS location of user device 102. Cellular location provider 204 may include one or more components of user device 102 for determining the location of user device 102 using cellular data. For example, cellular location provider 204 may use the Cell Global Identity (CGI), which includes a Mobile Country Code (MCC), Mobile Network Code (MNC), Location Area Code (LAC) and Cell Identification (CI), to determine the location of user device 102. Other location provider 206 may include any other suitable method for determining the location of user device 102. For example, other location provider 206 may use WiFi data to determine the location of user device 102. As another example, other location provider 206 may use third-party tools including precision location software to determine the location of user device to determine the location of user device 102.

In an exemplary embodiment of operation, MFA agent 200 receives a request for the location of user device 102. MFA agent 200 collects location indicators from a plurality of location providers and each location indicator indicates a possible location of user device 102. For example, MFA agent 200 may receive one location indicator from GPS system 202, one location indicator from cellular location provider 204, and one location indicator from other location provider 206. MFA agent 200 may receive two or more location indicators from two or more location providers. In certain embodiments, MFA agent 200 determines the location of user device 102 by selecting the common location indicated by the received location indicators. For example, if there are three location indicators from three different location providers and two of the location indicators are associated with a Location A and one location indicator is associated with a Location B, then Location A is selected as the location of the user device. If no single location is the most common location indicated by the received location indicators (e.g., two or more locations are tied for the most common location indicated by the received location indicators), MFA agent 200 may select the location indicated by a predetermined location provider. For example, an administrator may predefine a particular location provider (e.g., GPS system 202 or cellular location provider 204) as the controlling location provider in the event that two or more locations are tied for the most common location.

Although FIG. 2 illustrates a particular number of user devices 102, MFA agents 200, GPS systems 202, cellular location providers 204, and other location providers 206, this disclosure contemplates any suitable number of user devices 102, MFA agents 200, GPS systems 202, cellular location providers 204, and other location providers 206. Additionally, this disclosure contemplates any suitable arrangement of user device 102, MFA agent 200, GPS system 202, cellular location provider 204, and other location provider 206. Additionally, this disclosure contemplates any suitable combination of any suitable components, devices, or systems carrying out any suitable actions.

FIG. 3 illustrates a method for providing location-based access to a remote device, service, or database, in accordance with certain embodiments. Method 300 begins at step 310. At step 310, an MFA server (e.g., MFA server 106 of FIG. 1) transmits a request for a location of a user device (e.g., user device 102 of FIG. 1) to an MFA agent (e.g., MFA agent 200 of FIG. 2) on the user device. Method 300 then moves from step 310 to step 320.

At step 320, the MFA server receives the location of the user device. For example, the MFA agent may determine the location of the user device by gathering location indicators from various location providers and selecting the common location from among the location indicators. The location indicators are generated by location information providers including one or more of: a GPS system (e.g., GPS system 202 of FIG. 2), a cellular location provider (e.g., cellular location provider 204 of FIG. 2), and an other location provider (e.g., other location provider 206 of FIG. 2). The MFA agent may determine the location of the user device to be the common location from the various location indicators. The MFA agent may then transmit the determined location of the user device to the MFA server, which receives the transmitted location of the user device. Method 300 then moves from step 320 to step 330.

At step 330, the MFA server receives a location-based access policy from a policy server (e.g., policy server 108 of FIG. 1). For example, the location-based access policy may define an access policy based on a geographic border. As another example, the location-based access policy may define an access policy based on a proximity of the user device to a pre-defined location. As another example, the location-based access policy may define an access policy based on a combination of a geographic border and a proximity of the user device to a pre-defined location. As another example, the location-based access policy may define an access policy based on the presence of the user device in a region controlled by an organization (e.g., a military base, a corporate campus, etc.). Method 300 then moves from step 330 to step 340.

At step 340, the MFA server appends the location of the user device to the location-based access policy. For example, the location of the user device may be appended to the end of a data structure storing the location-based access policy. The location of the user device may be represented in a particular format when appended to the location-based access policy. For example, the location of the user device may be represented by a coordinate value (e.g., a latitude and longitude coordinate). As another example, the location of the user device may be represented by a geographic label (e.g., a country, a state, a providence, or a city). In certain embodiments, once the location of the user device is appended to the location-based access policy, the location-based access policy may be stored in storage on the MFA server. In certain other embodiments, the location-based access policy may be stored in storage on the policy server. In certain embodiments, when the location of the user device changes, the new location of the user device may be appended to the location-based access policy. Method 300 then moves from step 340 to step 350.

At step 350, the user device is authenticated by an authentication server (e.g., authentication server 104 of FIG. 1). For example, the authentication server may verify that the user of the user device has provided valid login credentials associated with the user. Method 300 then moves from step 350 to step 360.

At step 360, the MFA server receives an authentication result from the authentication server. The authentication result is based on the authentication of the user device in step 350. For example, if the user of the user device provides a valid login, the authentication server may provide an authentication result to the MFA server indicating that the user device is authenticated. Method 300 then moves from step 360 to step 370.

At step 370, the MFA server determines whether to allow the user device to access a remote device (e.g., remote device 110 of FIG. 1), a remote service (e.g., remote service 112 of FIG. 1), or a remote database (e.g., remote database 114 of FIG. 1) based on the location of the user device, the location-based access policy, and the authentication result. If MFA server determines not to allow the user device access, method 300 ends at step 370. If MFA server determines to allow the user device access, method 300 then moves from step 370 to step 380.

At step 380, the MFA server enables the user device to access the remote device, the remote service, or the remote database. Method 300 ends at step 380.

Although this disclosure describes and illustrates an example method 300 for a method for providing location-based access to a remote device, service, or database, including the particular steps of the method of FIG. 3, this disclosure contemplates any suitable method 300 for a method for providing location-based access to a remote device, service, or database, including any suitable steps, which may include all, some, or none of the steps of the method of FIG. 3, where appropriate. Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3.

FIG. 4 illustrates an example of a computer system, in accordance with certain embodiments. In particular embodiments, one or more computer systems 400 provide functionality described or illustrated herein. As an example, one or more computer systems 400 may be used to provide at least a portion of user device 102, MFA server 106, authentication server 104, policy server 108, remote device 110, remote service 112, or remote database 114 as described with respect to FIG. 1. As another example, one or more computer systems 400 may be used to provide at least a portion of MFA agent 200, GPS system 202, cellular location provider 204, or other location provider 206 as described with respect to FIG. 2. As another example, one or more computer systems 400 may be used to perform one or more steps as described with respect to FIG. 3. In particular embodiments, software running on one or more computer systems 400 provides functionality described or illustrated herein or performs one or more steps of one or more methods described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A system, comprising:
one or more processors; and
one or more computer-readable non-transitory storage media comprising instructions that, when executed by the one or more processors, cause one or more components of the system to perform operations comprising:
transmitting, to a multi-factor authentication (MFA) agent running on a user device, a request for a location of the user device;
receiving, from the MFA agent, the location of the user device, wherein the location is determined by the MFA agent to be a common location indicated by a plurality of location indicators;
receiving, from a policy server, a location-based access policy;
appending, to the location-based access policy, the location of the user device;
in response to appending the location of the user device to the location-based access policy, storing the location-based access policy;
receiving a first authentication result from an authentication server; and
determining, based on the location of the user device, the first authentication result, and the location-based access policy, a second authentication result, wherein the second authentication result indicates whether to allow the user device to access one or more of:
a remote service,
a remote database, and
a remote device.

2. The system of claim 1, wherein the plurality of location indicators is generated by a plurality of location information sources including one or more of:
a Global Positioning System (GPS),
a cellular location provider, and
an other location provider.

3. The system of claim 1, wherein the policy server is distributed using a plurality of policy server instances.

4. The system of claim 1, wherein determining the second authentication result comprises determining whether the user device is within a pre-defined geographic border.

5. The system of claim 1, wherein determining the second authentication result comprises determining whether the location of the user device corresponds to a geographic identifier associated with the user device.

6. The system of claim 1, the operations further comprising:
   authenticating, via the authentication server, the user device.

7. The system of claim 6, wherein determining the second authentication result is further based on an authentication result of authenticating the user device.

8. A method, comprising:
   transmitting, to a multi-factor authentication (MFA) agent running on a user device, a request for a location of the user device;
   receiving, from the MFA agent, the location of the user device, wherein the location is determined by the MFA agent to be a most common location indicated by a plurality of location indicators;
   receiving, from a policy server, a location-based access policy;
   appending, to the location-based access policy, the location of the user device; and
      in response to appending the location of the user device to the location-based access policy, storing the location-based access policy;
      receiving a first authentication result from an authentication server; and
      determining, based on the location of the user device, the first authentication result, and the location-based access policy, a second authentication result, wherein the second authentication result indicates whether to allow the user device to access one or more of:
         a remote service,
         a remote database, and
         a remote device.

9. The method of claim 8, wherein the plurality of location indicators are generated by a plurality of location information sources including one or more of:
   a Global Positioning System (GPS),
   a cellular location provider, and
   an other location provider.

10. The method of claim 8, wherein the policy server is distributed using a plurality of policy server instances.

11. The method of claim 8, wherein determining the second authentication result comprises determining whether the user device is within a pre-defined geographic border.

12. The method of claim 8, wherein determining the second authentication result comprises determining whether the location of the user device corresponds to a geographic identifier associated with the user device.

13. The method of claim 8, further comprising:
   authenticating, via the authentication server, the user device.

14. The method of claim 13, wherein determining the second authentication result is further based on an authentication result of authenticating the user device.

15. One or more computer-readable non-transitory storage media embodying instructions that, when executed by a processor, cause performance of operations comprising:
   transmitting, to a multi-factor authentication (MFA) agent running on a user device, a request for a location of the user device;
   receiving, from the MFA agent, the location of the user device, wherein the location is determined by the MFA agent to be a most common location indicated by a plurality of location indicators;
   receiving, from a policy server, a location-based access policy;
   appending, to the location-based access policy, the location of the user device; and
      in response to appending the location of the user device to the location-based access policy, storing the location-based access policy;
      receiving a first authentication result from an authentication server; and
      determining, based on the location of the user device, the first authentication result, and the location-based access policy, a second authentication result, wherein the second authentication result indicates whether to allow the user device to access one or more of:
         a remote service,
         a remote database, and
         a remote device.

16. The one or more computer-readable non-transitory storage media of claim 15, wherein the plurality of location indicators are generated by a plurality of location information sources including one or more of:
   a Global Positioning System (GPS),
   a cellular location provider, and
   an other location provider.

17. The one or more computer-readable non-transitory storage media of claim 15, wherein the policy server is distributed using a plurality of policy server instances.

18. The one or more computer-readable non-transitory storage media of claim 15, wherein determining the second authentication result comprises determining one or more of:
   whether the user device is within a pre-defined geographic border; and
   whether the location of the user device corresponds to a geographic identifier associated with the user device.

19. The one or more computer-readable non-transitory storage media of claim 15, further comprising:
   authenticating, via the authentication server, the user device.

20. The one or more computer-readable non-transitory storage media of claim 19, wherein determining the second authentication result is further based on an authentication result of authenticating the user device.

* * * * *